United States Patent [19]

Pearsall

[11] 4,074,418
[45] Feb. 21, 1978

[54] STATOR COIL WINDING AND LEAD WIRE CONNECTION

[75] Inventor: Harold I. Pearsall, Centerville, Ohio

[73] Assignee: The Globe Tool and Engineering Company, Dayton, Ohio

[21] Appl. No.: 708,190

[22] Filed: July 23, 1976

[51] Int. Cl.² .......................................... H02K 15/095
[52] U.S. Cl. .......................................... 29/596; 29/736
[58] Field of Search ............ 29/596, 597, 598, 205 R, 29/205 D, 205 C, 605, 628, 203 DT, 203 D, 732, 736; 310/71; 242/1.1 R, 1.1 A, 1.1 E

[56] References Cited

U.S. PATENT DOCUMENTS

| | | | |
|---|---|---|---|
| 3,725,707 | 4/1973 | Leimbach et al. | 310/71 |
| 3,747,187 | 7/1973 | Colwell | 29/596 X |
| 3,760,339 | 9/1973 | Marshall | 29/628 X |
| 3,812,570 | 5/1974 | Mason | 29/205 D |
| 3,901,454 | 8/1975 | Reiger, Jr. | 29/596 X |
| 3,927,469 | 12/1975 | Dammar | 29/205 C X |
| 3,984,908 | 10/1976 | Ackley | 29/205 D |

*Primary Examiner*—Carl E. Hall
*Attorney, Agent, or Firm*—Dybvig & Dybvig

[57] ABSTRACT

Method and apparatus for connecting stator coil lead wires to terminal connection means mounted on a 2-pole stator core at a coil winding station. Also disclosed is an improved lead loop hook assembly.

12 Claims, 17 Drawing Figures

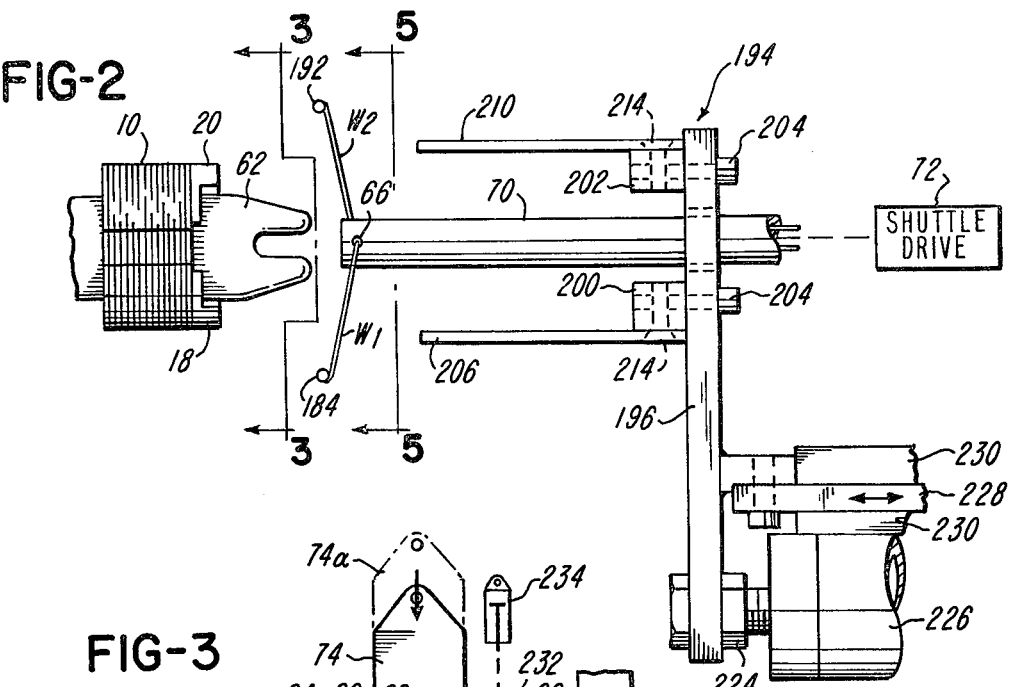
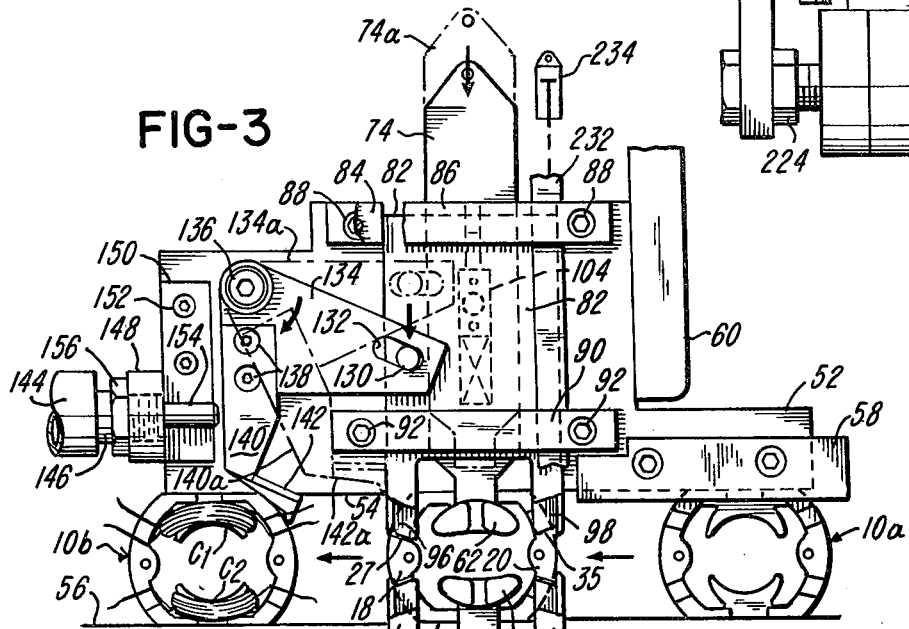
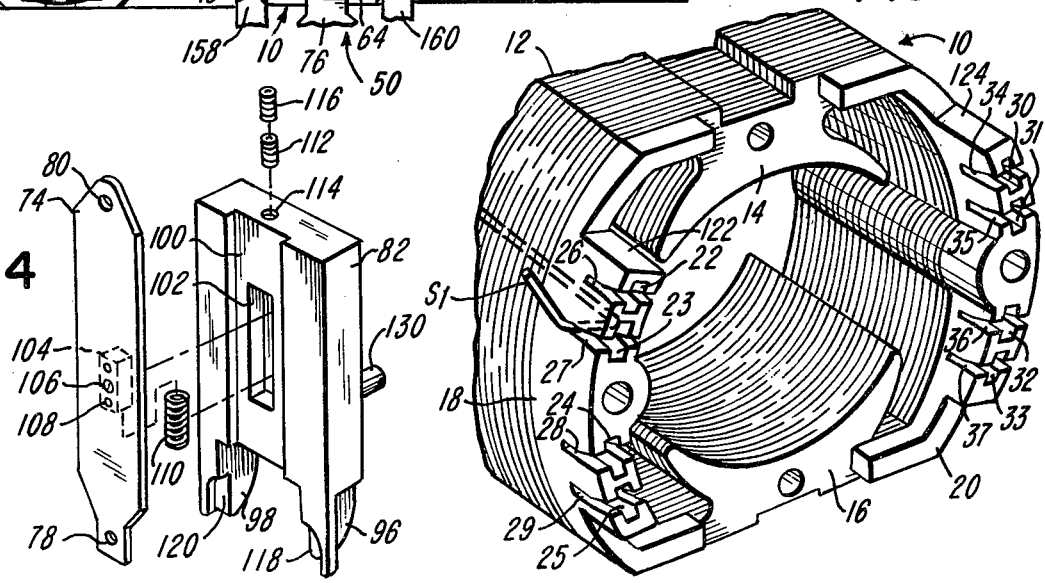

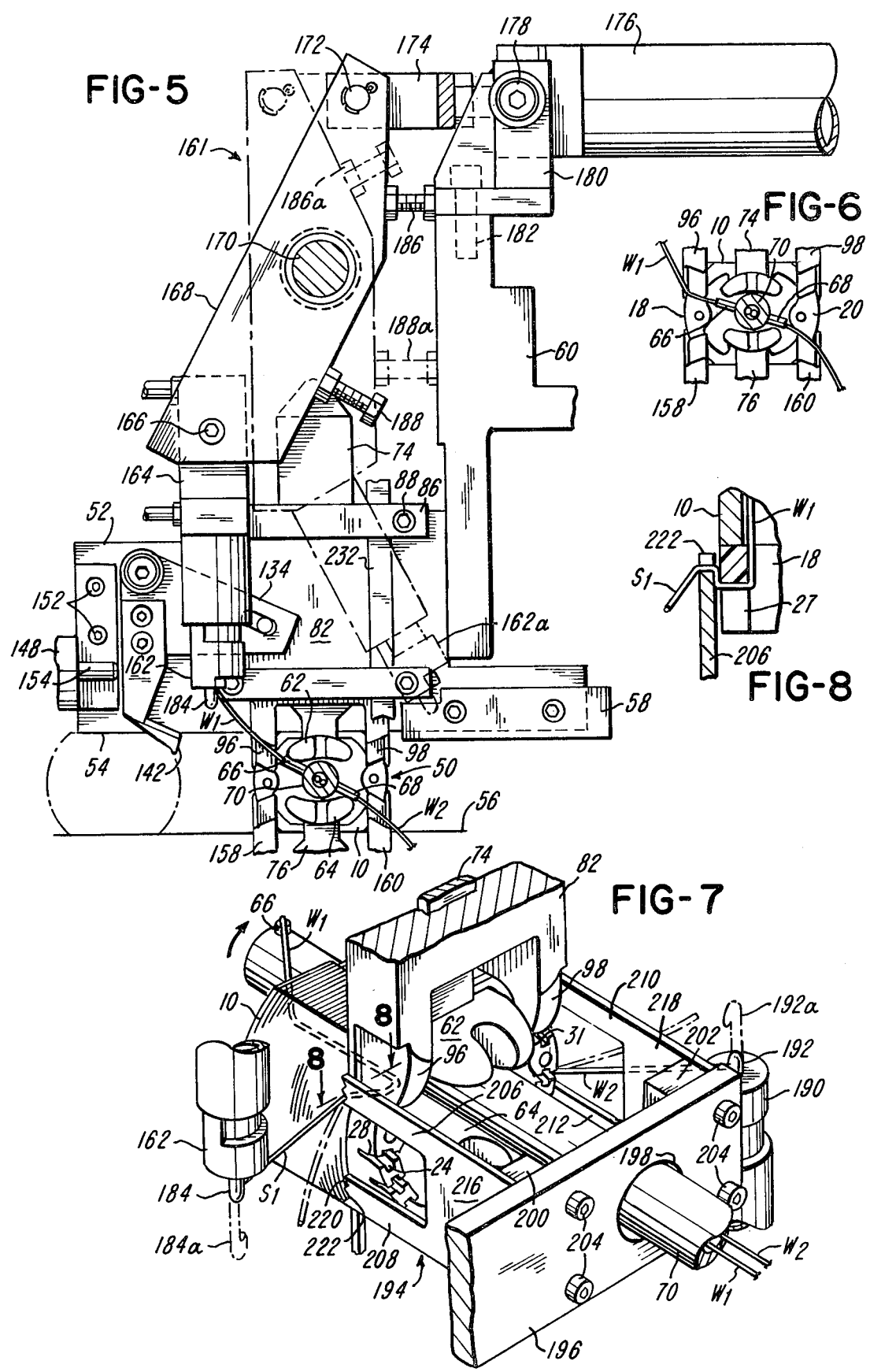

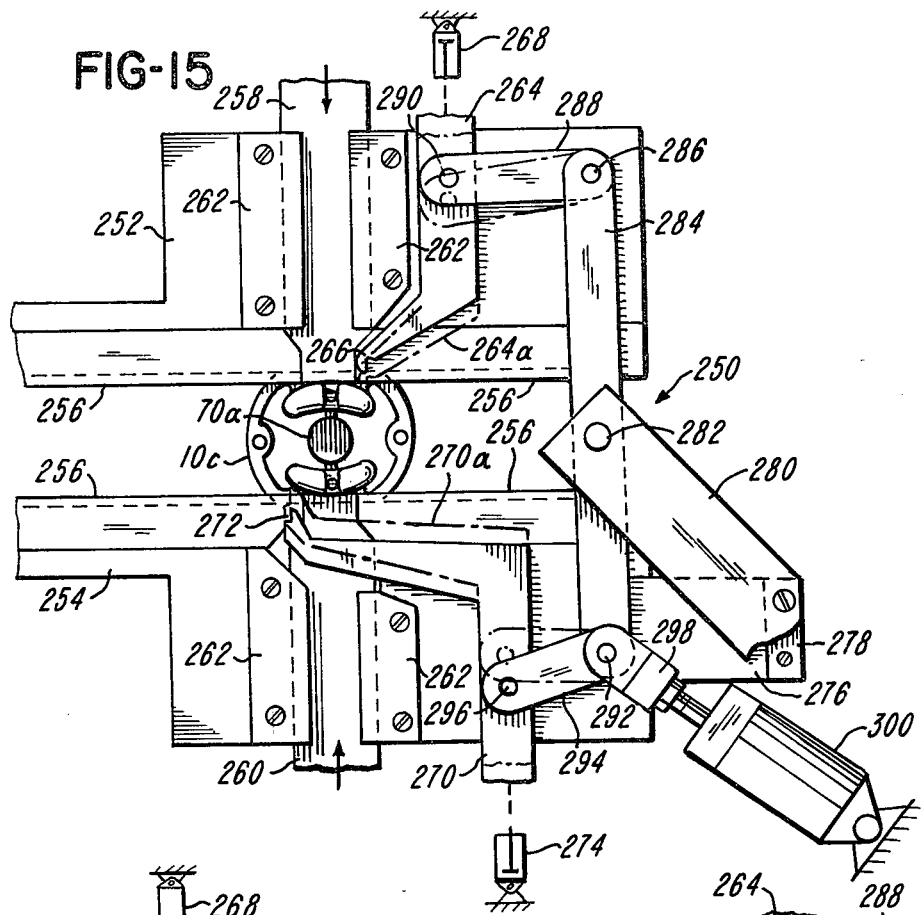
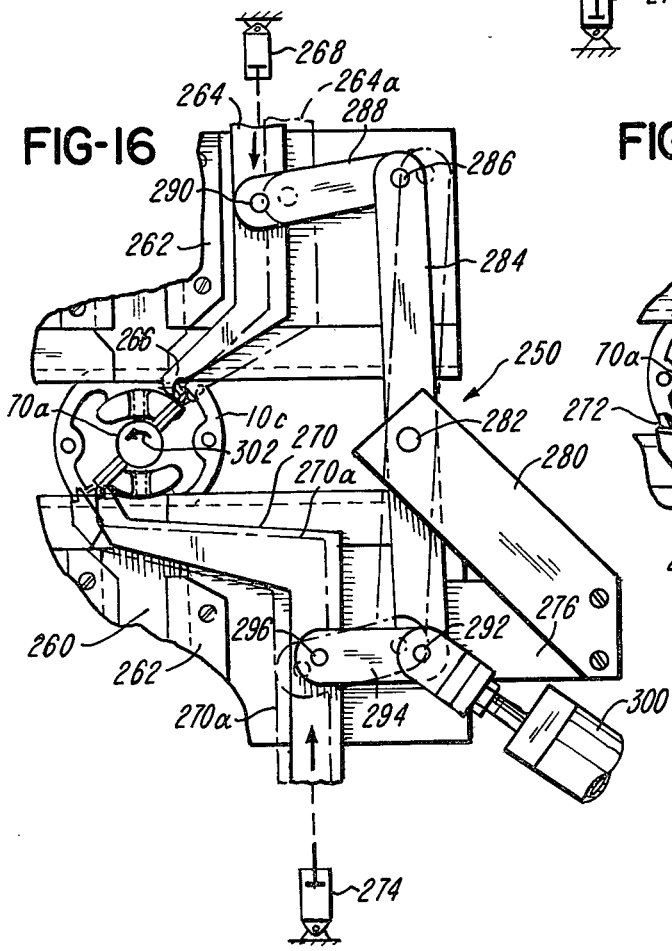
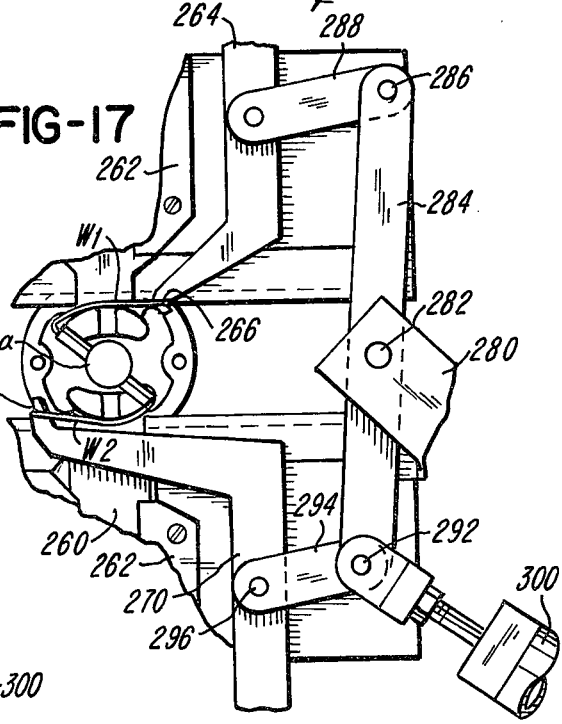

4,074,418

STATOR COIL WINDING AND LEAD WIRE CONNECTION

BACKGROUND OF THE INVENTION

This invention relates to the winding of coils on stators and particularly to the automatic connection of stator coil lead wires to terminal connection devices mounted on stator cores. The invention is intended for use in winding 2-pole stators but may have application to other stators as well. In the last several years, various improvements in automatically effecting terminal connections of 2-pole stator coil lead wires have been suggested and developed. One such improvement is shown in Colwell, U.S. Pat. No. 3,747,187, granted July 24, 1973.

The apparatus shown in the above mentioned Colwell patent satisfactorily accomplishes the stator coil termination on the stator frame, but it and other known devices for the same purpose are relatively complex and expensive and, insofar as known, have been separate from the stator coil winding machines. Accordingly it has been necessary to provide additional handling devices for properly locating and/or maintaining the location of the stator coil lead wires during the interval in which the coils have been wound and the stator with the wound coil transferred to the machine or station for effecting the terminal connections.

SUMMARY OF THE INVENTION

In accordance with this invention, stator coil lead wires are automatically connected to termination devices mounted on the stator core while the stator core is located at the coil winding station so that subsequent handling of the stator is considerably simplified. The apparatus of this invention includes wire clamp and wire guide means so located and cooperating with a coil winding shuttle that the coil lead wires are automatically located in positions for connection to the termination devices during the winding cycle. The actual connection of the lead wires to the termination devices is accomplished during and/or immediately following the winding of the stator coils while the stator is still located at the winding station so that, when it leaves the winding station, the connections to the terminal devices are completed.

The invention is described with reference to termination devices in the form of terminal boards having slotted receptacle portions with slots therein. The terminal boards are made from an insulating material and the coil lead wires are inserted into the bottoms of selected ones of the slots. the frictional engagement of the lead wires within the slots is sufficient to hold them during subsequent handling operations. At a subsequent handling step, which is not part of the present invention, conductive terminal pieces are inserted into the receptacle and engaged with the lead wires for making an electrical connection thereto. However, it will be appreciated that, in its broader aspects, this invention is applicable to the connection of lead wires to other types of termination devices.

For the purpose of inserting the lead wires into the bottoms of the slots, this invention provides simple wire inserting devices which effect insertion of the lead wires fully into the bottoms of the slots.

This invention includes method steps carried out in sequence for obtaining the desired connection of the lead wires to the termination devices. In a modification, an improved lead hook assembly is provided for holding the start wires of the coil off to the sides of the pole pieces on which the coils are wound to prevent the winding of the start wires under subsequently wound turns of the coils and this invention includes a modified sequence of steps when a lead loop hook assembly is used.

BRIEF DESCRIPTION OF THE DRAWINGS

FIG. 1 is a perspective view of a portion of an unwound 2-pole stator core having plastic terminal boards with lead wire receiving slots and showing a portion of the wire used in winding one of the coils in the position it occupies at the beginning of the winding operation.

FIG. 2 is a plan view of a stator in position to be wound with winding forms connected thereto, the stator coil winding apparatus which is partly schematically illustrated, and a portion of the mechanism in accordance with this invention for inserting the stator coil lead wires into the terminal board slots.

FIG. 3 is an elevational view with parts broken away, as viewed generally from the planes indicated by view line 3—3 of FIG. 2, and illustrating the progress of stators to and away from the winding station, and further illustrating winding forms, form retainers and mechanisms for selecting the slots into which the lead wires are to be placed and for guiding the lead wires into alignment with such slots.

FIG. 4 is an exploded perspective view of a portion of the mechanism illustrated in FIG. 3 used for retaining a winding form and for guiding lead wires into the proper slots.

FIG. 5 is an elevational view, with parts broken away, as viewed generally from the plane indicated by view line 5—5 of FIG. 2 and illustrating a stator coil lead pull, cut and hold device and mechanism associated therewith for appropriately positioning the device relative to the stator to locate the start and finish leads in position to be inserted into the proper terminal board slots.

FIG. 6 is an elevational view of a portion of the mechanism of FIG. 5 and illustrating the manner in which coil start wires are guided into the proper terminal board slots at the beginning of the winding of a stator.

FIG. 7 is a perspective view illustrating the manner in which the start wires are inserted fully into the terminal board slots as the winding of the stator continues. FIG. 7 also illustrates the manner in which the start wires are thereafter released by the lead pull, cut and hold devices.

FIG. 8 is a cross sectional view taken along section line 8—8 of FIG. 7 showing the relationship of a start wire, a terminal board and a portion of the device for inserting the lead wires into the teminal board slots.

FIG. 15 is an elevational view of an improved lead loop hook assembly which may be used in accordance with this invention for holding a portion of the first turns of wire wound on the stator to prevent winding of the start wires under succeeding coil turns.

FIGS. 16 and 17 are elevational views of parts of the apparatus shown in FIG. 15 and illustrating the sequence of operation thereof.

DESCRIPTION OF THE PREFERRED EMBODIMENTS

Figure 9:
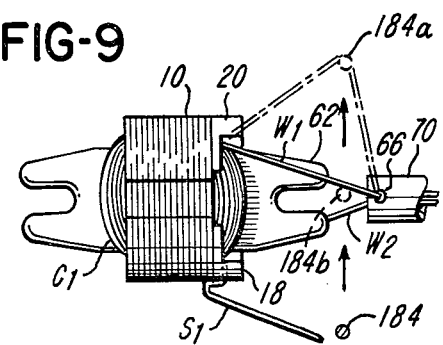
FIG. 9 is a plan view of the stator and a portion of the winding apparatus and diagrammatically illustrating the movement of the lead pull, cut and hold device to commence the connection of a finish wire to the terminal board after a coil has been wound.

Referring to FIG. 1, a type of stator core generally designated 10 with which this invention may be used is illustrated as comprising a stack of laminations 12 arranged to form an inwardly directed upper pole piece 14 and an inwardly directed lower pole piece 16. The laminations may be held together in any suitable fashion such as by riveting or welding. For the purpose of forming coil lead wire connections, the stator core 10 has been provided with a pair of insulating plastic terminal boards 18 and 20. The terminal boards lie against an end face of the laminations forming the core 10 and are connected thereto in any suitable fashion. The terminal boards 18 and 20 are extended generally between the pole pieces 14 and 16. Optionally the terminal boards may be connected together by parts spanning across the pole pieces 14 and 16 and such parts may, if desired include a coil end support as will be appreciated by those familiar with the art. As will also be appreciated, an insulating liner covering the inside surfaces of the laminations between the pole pieces 14 and 16 and the outer surfaces of the pole pieces has been omitted from the drawings.

The terminal board 18 has four generally rectangular hollow sockets or receptacles 22, 23, 24 and 25 opening to the end of the board opposite the laminations 12. Transverse lead wire receiving slots 26, 27, 28 and 29 extend generally radially across the sockets 22, 23, 24 and 25, respectively. The terminal board 20 similarly has four sockets or receptacles 30, 31, 32 and 33 with transverse slots 34, 35, 36 and 37, respectively. In accordance with this invention coil lead wires are inserted into selected ones of the transverse slots in the terminal board and held by a friction fit therein for later connection to a terminal connection (not shown). The slots are relatively wide at their mouths and taper inwardly so that lead wires inserted into the bottoms of the slots will be firmly gripped. FIG. 1 also illustrates a stator coil start wire $S_1$, the free end of which extends to the outside of the terminal board 18 and the intermediate portion of which is frictionally held within the slots 27.

In accordance with this invention the stator coil lead wires are connected to the terminal boards 18 and 20 while the stator core is located at a winding station in position to be wound. Therefore it is unnecessary to provide a second handling station or machine for connection of the lead wires to the terminal boards and all lead wire connections can be made including start and finish wires as well as tap coil lead wires without further concern for the position of the lead wires during subsequent handling of the stator.

With reference to FIGS. 2, 3 and 5, the stator core 10 is shown in position to be wound at the winding station 50 of an automatic winding machine. In FIG. 3 the progress of the stator into and out of the winding station 50 is illustrated, with an unwound stator 10a entering from the right side and a wound stator 10b exiting from the left side. The stators are supported and guided by an assembly including an upper stator locater plate 52 having a lower edge 54 resting on the top surfaces of the stators. There is a second upper stator locater plate which is not illustrated located beneath the plane of the drawing. The two upper stator locater plates are positioned to engage the opposite ends of the top surfaces of the stators 10. Each stator rests upon a pair of lower stator locater plates, the top edge of one of the lower plates being indicated by line 56 in FIGS. 3 and 5

The assembly including the plates 52 is adapted to be mounted in an assembly line and there would be a load track extending to the right side of FIG. 3 and unwound stators, such as stator 10a, would be moved by any suitable mechanism from the load track into the area between the stator locater plates. As they are moved from the load track onto the support assembly, the unwound cores are guided by guide rails 58, only one of which is illustrated in FIGS. 3 and 5, mounted on the stator locater plates. There would be another guide rail located beneath the plane of the drawing and there are two additional guide rails attached to the lower stator locater plates. The function of the guide rails is to locate the stators transversely of the stator locater plates so that they will arrive at the winding station 50 in the proper position. After leaving the winding station 50, the wound stators progress to the left as illustrated in FIG. 3 and onto an unload track (not shown). At such time they may be guided in part by the stator locater plates and in part by guides connected to the unload track which are not illustrated. All of the stator locater plates are affixed to a permanent part of the machine such as a portion of a winder frame 60 in any suitable fashion. The support and guide assembly illustrated is of general type shown also in Reiger, Jr., U.S. Pat. No. 3,901,454, granted Aug. 26, 1975, that has been used for many years and the details of construction form no part of this invention. As described in the above mentioned Reiger, Jr. patent, means (not shown herein) are desirably provided for accurately positioning a stator at winding station 50 in preparation for the winding of coils.

The winding of a stator located at the winding station 50 can, as conventional, be accomplished by a mechanism diagrammatically illustrated in FIG. 2. For this purpose two winding form assemblies, an upper assembly 62 and a lower assembly 64, are temporarily connected to the stator core 10. Each assembly 62 and 64 comprises two winding forms projecting from opposite ends of the stator core and adapted to guide wires around the pole pieces 14 and 16. In FIG. 2 the wire for winding the upper coil is designated $W_1$ and the wire for winding the lower coil is designated $W_2$. At the beginning of the winding the free ends of the wires are clamped in a manner which will be further described below. The wires extend through needles 66 and 68 located at the end of a winding ram or shuttle 70 from a suitable supply of wire under tension. The winding ram or shuttle 70 is driven by a shuttle drive mechanism 72 through repeated oscillatory and reciprocatory motions causing the needles 66 and 68 to be extended to and fro through the stator core and rotated at each end of the core so that, in cooperation with the winding forms, the wires are laid against the sides of the pole pieces 14 and 16 as the needles are extended through the core and across the ends of the pole pieces 14 and 16 as the winding shuttle is oscillated. A variety of shuttle drive mechanisms for accomplishing this result are in use and well known to those familiar with the art.

As more fully described in the above mentioned Reiger, Jr. patent, the winding form assemblies are located in position relative to a stator core at the winding station 50 by two upper form retainer plates 74 and two lower form retainer plates 76. Only one of each of the plates 74 and 76 is illustrated in FIGS. 3 and 5, the other plates being located below the plane of the drawings in alignment with the illustrated plates. As shown in FIG. 4, the illustrated retainer plate 74 has an aperture 78 adapted to engage a notch in a pin (not shown) connected to the adjacent winding form. In operation the retainer plate 74 is retracted away from the winding station 50 after one stator is wound and while the next unwound stator is positioned in the winding station 50. The retainer plate 74 is then moved downwardly so as to be in a position that the aforementioned pin attached to the winding form can be inserted through the aperture 78. Immediately thereafter the retainer plate 74 is moved upwardly by a fraction of an inch so that the lower margin of the aperture 78 will enter into the aforementioned notch in the pin to hold the winding form in place during the winding operation. At the end of the winding operation, the retainer plate 74 is again moved downwardly to release the pin so that the winding form can be removed. The operations of the three other retaining plates are essentially the same so that all of the winding forms may be locked thereby as described in the above mentioned Reiger, Jr. patent. As illustrated in FIGS. 3 and 4 herein, the upper end of the retainer plate 74 has an aperture 80 for connection to an air cylinder for accomplishing the aforedescribed movement. The other retainer plates are similarly connected to air cylinders.

The parts as thus far described are all conventional in the winding of stators of the type illustrated in FIG. 1. The practice in the past has been to arrange for some mechanism to temporarily clamp the free ends of the wires projecting from the needles, proceed with and complete the winding of the coils on the stator pole pieces and then pull, cut and clamp the finish wires so that the stator is cut free from the winding ram or shuttle. Techniques have been developed for holding the coil start and finish wires while the stator is moved from the winding station to another station, and other apparatus separate from the winding station has been provided for later handling of the stator lead wires.

In accordance with this invention, the coil lead wires are placed into appropriate ones of the slots in the terminal boards 18 and 20 at the winding station 50 in a manner discussed immediately below. The apparatus and method of accomplishing the connection of the lead wires to the terminal boards is described primarily with reference to a coil designated $C_1$ that is wound around the pole piece 14, and its associated lead wires. The mechanism for accomplishing the connection of the lead wires associated with a coil $C_2$ that is wound around the lower pole piece 16 is preferably essentially identical to the mechanism used for the lead wires associated with coil $C_1$. To avoid an unnecessary duplication of description, such mechanism is not illustrated or described in detail herein.

With reference to FIGS. 3 and 4, a wire guide member 82 is mounted for sliding movement on the stator locater plate 52 by a tooling guide arrangement comprising a pair of upper guide blocks 84, only one of which can be seen in FIG. 3, that are spanned by an upper guide plate 86 and connected thereto and to the locater plate 52 by bolts 88. The tooling guide further includes a pair of lower guide blocks to which a lower guide plate 90 is connected by bolts 92. The lower guide blocks are not shown since hidden by the lower guide plate 90. the guide blocks confine the wire guide member 82 for vertical movement which is radial with respect to the center axis of the stator at the winding station 50 and also serve as spacers for the guide plates 86 and 90 so that the plates 86 and 90 are effective to hold the wire guide member 82 against the stator locater plate 52.

The wire guide member 82 is generally in the form of an elongate rectangular block or plate having spaced depending wire guide fingers 96 and 98 with arcuately convex outer surfaces and lower edges adapted to be aligned with the selected ones of the slots in the terminal boards 18 and 20. The face of the wire guide member 82 confronting the stator locater plate 52 is provided with a vertically extending groove 100 for slidably receiving the associated form retainer plate 74. A rectangular hole 102 is formed centrally of the groove 100 for receiving a solid block 104, termed for convenience a spring block, that may be connected to the form retainer plate 74 by a screw 106 and held in accurate alignment therewith by dowel pins 108. When the wire guide member 82 and the form retainer plate 74 are assembled onto the locater plate 52, the spring block 104 is located generally centrally of the hole 102. Mounted beneath the spring block 104 and within the hole 102 is a coil spring 110 which tends to bias the wire guide member 82 downwardly relative to the retainer plate 74. The degree to which the wire guide member 82 is thus biased downwardly may be accurately adjusted by an adjustment screw 112 threaded into a bore 114 extending from the top of the wire guide member 82, the preselected adjustment being fixed by a lock screw 116.

As is readily apparent, the wire guide member 82 will move vertically up and down with the corresponding movements of the form retainer plate 74 except for minor differences in motion permitted by the spring 110. In use, when the form retainer plate 74 is retracted from the winding station 50 into the position illustrated by phantom lines 74a in FIG. 3, the wire guide member 82 will be retracted from the winding station 50 by a similar distance. When an unwound stator is located in the winding station 50 and the form retainer plate 74 moved downwardly so as to be positioned for initiating the locking of one of the winding forms, the wire guide member 82 will similarly be lowered into the area of the winding station 50. The lowered position of these parts is illustrated in FIG. 3. At such time the lower ends of the wire guide fingers 96 and 98 are aligned with the upper edges of the transverse slots 27 and 35 of the terminal boards 18 and 20.

In FIG. 4 it will be noted that notches 118 and 120 are formed in the rear parts of the wire guide fingers 96 and 98, respectively. The uppermost surfaces of the notches 118 and 120 are adapted to engage and rest on uppermost shoulders 122 and 124 on the terminal boards 18 and 20, respectively. The engagement of the shoulders 122 and 124 by the surfaces of the fingers 96 and 98 prevents continued downward movement of the wire guide member 82. However, the form retainer plate 74 can continue downward motion through a short distance as permitted by the collapse of the spring 110 to permit the movement of the retainer plate 74 required for the locking of the winding form.

A drive pin 130 is mounted on the exposed face of the wire guide member 82 for engagement in an elongate slot 132 in a slot selection linkage arm 134 pivotally mounted by a pivot stud 136 to the stator locater plate 52. Because of its connection to the drive pin 130, the slot selection plate 134 will pivot from its position shown in full lines in FIG. 3 to that illustrated by phantom lines 134a. Connected as by bolts 138 to the linkage arm 134 is a drive plate 140. The drive plate 140 and the linkage arm 134 are together generally in the form of a bell crank. Connected to the lower end of the drive plate 140 is a stator advancement finger 142, the purpose of which will be discussed below. When the linkage arm 134 is pivoted to the position shown by phantom lines 134a, the drive plate 140 and the finger 142 are moved to the positions illustrated by phantom lines 140a and 142a in FIG. 3.

As previously noted, the wire guide member 82 is moved downwardly with the form retainer plate 74 so that it initially occupies the position shown in FIG. 3 with the lower edges of the guide fingers 96 and 98 aligned with the slots 27 and 35. The guide member 82 may be raised so as to position the lower edges of the fingers in alignment with the upper transverse slots 26 and 34 in the terminal boards 18 and 20, respectively, by energization of an air operated slot selection cylinder 144 connected by a coupling 146 threaded into a mounting block 148 that is supported by a mounting plate 150 connected to the stator locater plate 52 as by bolts 152. The mounting of the slot selection cylinder 144 is such that its piston rod 154 can be extended to engage an edge of the drive plate 140 to pivot it and the linkage arm 134 in a counterclockwise direction as viewed in FIG. 3 about the pivot stud 136 so as to elevate the wire guide member 82. The distance through which the wire guide member 82 may be elevated can be accurately adjusted by threading of the coupling 146 into and out of the mounting block 148 and the adjusted position retained by a lock nut 156.

As previously indicated, a winding form member identical to the member 82 is mounted below the top edge 56 for guiding lead wires from the lower coil $C_2$ into the appropriate slots in the terminal boards 18 and 20. Such member includes wire guide fingers 158 and 160 shown in FIGS. 3 and 5 and the mechanism including the slot selection cylinder 144, the drive plate 140 and the linkage arm 134 is also duplicated for properly positioning the wire guide fingers 158 and 160 relative to the slots below the horizontal centerline of the terminal boards 18 and 20. The operations of the slot selection cylinders are controlled by machine circuitry which, since conventional, is not illustrated herein, such cylinders being separately energizable so that the upper and lower wire guide fingers may independently be located where desired.

FIG. 5 shows a lead pull, cut and hold assembly generally designated 161 comprising a lead pull, cut and hold device 162 operated by a lead pull, cut and hold cylinder 164 mounted by a bolt 166 to the lower end of a pivot or wipe arm 168 which in turn is pivotally mounted to a pivot bar 170 that is fixed to the frame of the machine. The upper end of the pivot or wipe arm 168 is connected by a clevis pin 172 to a cylinder clevis 174 of a wipe cylinder 176 pivotally mounted by a pivot pin 178 to a cylinder mounting bracket 180 affixed to the winder frame 60 as by a bolt 182.

The lead pull, cut and hold device 162 may be of various conventional designs and the details of construction thereof form no part of this invention. The device illustrated includes a hook 184 that is extended and retracted by operation of the cylinder 164. As will become apparent, the hook 184 is designed to be extended and engage the section of wire $W_1$ between the needle 66 and the finish wire of a coil wound about the pole piece 14. For this reason the device 162 is mounted so as to move in a plane between the winding form assembly 62 and the shuttle 70 when it is in its retracted position shown in FIG. 2. After the hook 184 engages a section of wire $W_1$, the cylinder 164 may retract the hook 184 whereupon it is drawn against a surface of the device 162 pulling the wire with it whereupon the wire is clamped to such surface. Typically the surface would be spring biased or otherwise resilient so that a cutting edge associated with the device 162 will cause the wire to be severed immediately adjacent its clamped portion. In other devices for the same purpose, a separate cutter may be mounted on the clamp device for accomplishing the same result.

The lead pull, cut and hold device 162 is mounted for pivotal movement about the bar 170 under control of the cylinder 176 in accordance with this invention for the purpose of moving or "wiping" the device 162 along the aforementioned plane between the position thereof illustrated in full lines in FIG. 5 and the position indicated by phantom lines 162a in FIG. 5. These two extreme positions of the device 162 are on opposite sides of a stator at the winding station 50, and it is apparent that wire clamped to the device 162 extending from the needle 66 can be held either in front of the wire guide finger 86 or the guide finger 98. The angle of the device 162 relative to the guide fingers 96 and 98 can be accurately adjusted by loosening the bolt 166 and rotating the cylinder 164 relative to the pivot or wipe arm about the axis of the bolt 166. The end positions of the throw of the device 162 can be accurately fixed by adjustment of a pair of adjusting bolts or spacers 186 and 188 which are mounted on the pivot or wipe arm 168 in confronting relation to surface portions of the winder frame 60 adapted, as indicated by the full line and phantom line 168a and 188a positions thereof to engage such surface portions for mechanically stopping the pivotal movement of the pivot or wipe arm 168 at the desired two end positions of the device 162.

The lead pull, cut and hold assembly 161 illustrated in FIG. 5 would also be duplicated beneath the top edge 56 for engagement with the wire $W_2$ extending from the needle 68. Such assembly would include a lead pull, cut and hold device 190 (FIG. 7) having a wire engaging hook 192. The extending positions of the hooks 184 and 192 are illustrated at 184a and 192a in FIG. 7. The devices 162 and 190 are independently operable and pivotal under control of the machine circuitry because there may be winding operations as described below during which, for example, the device 162 will be used to pull, cut and clamp a section of the wire $W_1$ at a time when the wire $W_2$ will be left undisturbed.

With reference to FIGS. 2 and 7, the apparatus of this invention further includes a lead wire insertion assembly generally designated 194 comprising a mounting plate 196 located in a plane transverse to the longitudinal axis of the shuttle 70 and having a clearance hole 198 through which the shuttle 70 reciprocates. A pair of mounting blocks 200 and 202 are connected as by bolts 204 to the mounting plate 196 on opposite sides of the clearance hole 190. Two pairs of wire insertion fingers comprising a first pair of fingers 206 and 208 and a second pair of fingers 210 and 212 are affixed to the mounting blocks 200 and 202 as by screws 214. Each pair of wire insertion fingers may be cut from a plate such as plates 216 and 218 for purposes of attachment to the mounting blocks 200 and 202. Each finger is identically constructed and has a pair of notches 220 and 222 at the end surface thereof confronting the winding station 50. The notches 220 and 222 are each aligned substantially in the same horizontal plane as one of the transverse slots in the terminal boards 18 and 20. Accordingly there is a notch 220 or 222 in one of the fingers aligned with each of the transverse slots in the terminal boards.

As shown in FIG. 7, the mounting plate 196 is connected by a coupling 224 to an air-operated wire insertion cylinder 226 used to move the insertion fingers toward and away from the stator at the winding station 50. The mounting plate 196 may also be connected to a sliding plate 228 which slides between fixed members 230 to accurately guide the mounting plate 196 and, accordingly, the insertion fingers in their movements toward the stator.

The pair of wire insertion fingers 206 and 208 are spaced from the pair of wire insertion fingers 210 and 212 by a distance slightly greater than the width of the stators being wound, the insertion fingers being so located that, when they are moved toward a stator at station 50 by operation of the air cylinder 226, the notched ends thereof will pass immediately adjacent the outside surface of the terminal boards 18 and 20. This relationship of parts is shown in FIGS. 7 and 8. Accordingly, any wires that are substantially aligned with one of the various slots in the terminal boards 18 and 20 will be engaged by one of the insertion finger notches. The wire insertion cylinder 226 is designed to extend the insertion fingers so that their notched ends will extend to a point beyond the bottoms of the transverse slots so that wires located in their paths will be forced deep to the bottoms of the slots.

The operation of the apparatus described above in winding a stator and forming coil lead wire connections to the terminal boards 18 and 20 is as follows. At the beginning of the winding of the coils, the wires $W_1$ and $W_2$ are located as shown in FIG. 2 wherein it will be noted that the start wire $W_1$ is clamped by the hook 184 to the device 162. The wire $W_2$ is also clamped at the same time by the hook 192. The shuttle 70 is then oscillated through approximately half of its total oscillation such that its needles 66 and 68 are then aligned as illustrated in FIG. 5 in readiness for the shuttle 70 to be reciprocated through the winding form assemblies and the stator. As the shuttle 70 begins its reciprocatory motion, the wire $W_1$ engages the sloping portion of the wire guide finger 96 and the wire $W_2$ engages the sloping surface of the wire guide finger 160. As the shuttle continues its movement through the stator core, the wires are thereby caused to slide along the sloping surfaces of the wire guide fingers into substantial alignment with the transverse slots 27 and 36, respectively. The wires are caused to slide along the wire guide fingers because of the tension on the wires which still remain clamped by the devices 162 and 190 and because the needles 66 and 68 are closer to the horizontal centerline of the stator than are the devices 162 and 190. FIG. 6 shows the aligned position of the wires $W_1$ and $W_2$ with the terminal board slots at the end of the travel of the shuttle 70 through the stator 10. Immediately thereafter, the wire insertion cylinder 226 is energized to cause the coil insertion fingers 206, 208, 210 and 212 to be advanced, as shown in FIG. 7, into straddling relationship with the terminal boards 18 and 20 as a result of which the portions of the wires $W_1$ and $W_2$ between the terminal boards and the clamped ends thereof are engaged by notches in the ends of the insertion fingers whereupon these wire portions are inserted into the bottoms of the transverse slots 27 and 36 in the terminal boards. It may be observed at this time that the engagement of the wires by the insertion fingers and continued movement of the insertion fingers will cause wire to be drawn from the wire supplies through the needles 66 and 68.

At the time the coil insertion fingers are extended as shown in FIG. 7, a part of the first turn of the coils is wound. The winding can continue without stoppage until the desired number of turns have been wound on each of the pole pieces 14 and 16. At any time during this winding operation, the wire insertion cylinder 226 may be energized to retract the insertion fingers. After the first turn or turns of the coils have been wound, the hooks 184 and 192 may be extended to release the clamped ends of the wires $W_1$ and $W_2$, the wire ends then freely projecting beyond the sides of the terminal boards 18 and 20 as shown in phantom lines in FIG. 7.

In many cases the two coils wound on the pole pieces 114 and 116 will be wound with the same number of turns so that there will then be two start wires, one for each coil, and two finish wires, one for each coil. In other cases one or both coils will have intermediate taps so that the winding of both coils will be interrupted after a given number of turns have been wound and then tap leads will be formed on one or both coils. Thereafter the winding will continue to completion of the full number of turns desired and final finish leads will be formed.

FIGS. 9–14 illustrate a portion of the winding procedure wherein the coils $C_1$ and $C_2$ are partially wound sufficient to form a number of turns desired for use of the partly wound coil $C_1$ as a tap coil. Accordingly, it is necessary to draw a finish lead from the partially wound coil $C_1$ and, in accordance with this invention, connect it to the terminal block 20 and then to form a start wire for connection to the terminal block 18 preparatory to completion of the full winding of both coils $C_1$ and $C_2$. The tap coil finish wire, designated $F_1$, is connected to the terminal board 20 in the following manner.

With reference to FIG. 9, the device 162 has already released the start wire portion $S_1$ and the shuttle 70 is stopped in the dead center position retracted away from the stator 10. At this time the hook 184 of the device 162 is extended downwardly and the wipe cylinder 176 is actuated to cause the device 162 to move from the side adjacent the terminal board 18 to the side adjacent the terminal board 20, during which movement, as indicated at 184*b*, the hook 184 engages the length of wire $W_1$ extending from the coil $C_1$ to the needle 66, and as the device 162 continues to wipe between the shuttle 70 and the stator 10, wire is pulled through the needle 66 so that the wire ultimately is located as indicated by phantom lines in FIG. 9 and full lines in FIG. 10. At this time, the section of wire between the hook 184 and the coil $C_1$ is moved into engagement with the guide finger 98 in approximate alignment with one of the transverse slots in the terminal board 20.

Figure 10:
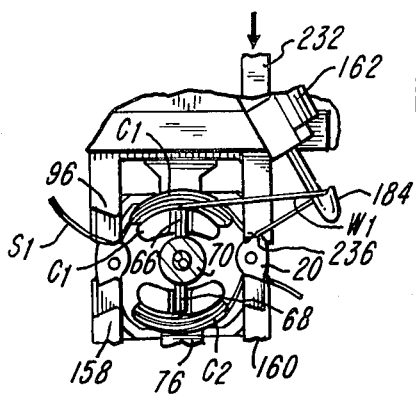
FIG. 10 is an elevational view of a portion of the apparatus shown in FIG. 5 at the completion of the operation shown in FIG. 9 and also illustrating the operation of a wire positioning blade.

Depending upon the type of tooling involved and the specific design of the terminal boards 18 and 20, it may be necessary to engage the latter section of wire by a supplementary wire positioning device which will be effective to bend the wire if needed into a location where it can be engaged by the proper notch 220 or 222 in wire insertion finger 210. With reference to FIGS. 3 and 10, a supplementary wire positioning member in the form of an elongate blade 232 movable along a vertical path in notches in the upper and lower guide plates 86 and 90 and driven along that path by an air cylinder or the like 234 has a notch 236 in its lower end for engaging and more accurately aligning the section of the wire $W_1$ with one of the transverse slots. It should be noted that there may be many instances in which a supplementary device such as the blade 232 will not be needed.

Figure 11:
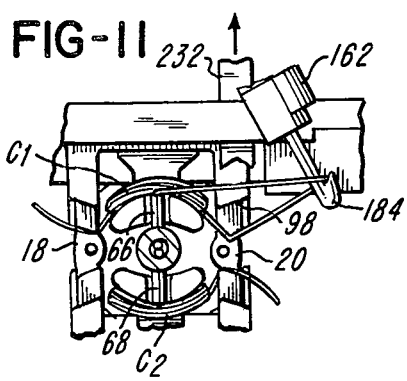
FIG. 11 is a view similar to FIG. 10 but showing the position of the wire upon retraction of the positioning blade.
Figure 12:
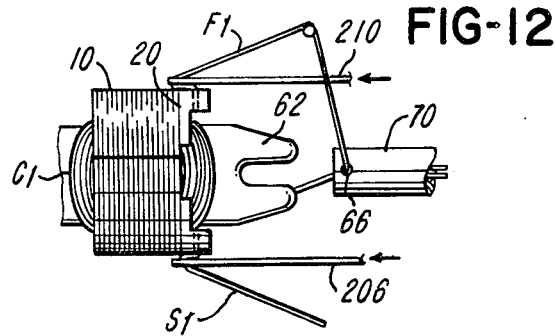
FIG. 12 is a plan view similar to FIG. 9 and illustrating the insertion of the finish wire after it is located as illustrated in FIG. 11 into the appropriate terminal board slot.
Figure 13:
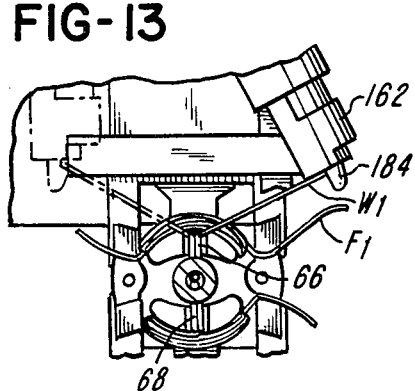
FIG. 13 is an elevational view similar to FIGS. 10 and 11 and illustrating the cutting of the finish wire which was inserted into the terminal board slot and the movement of the lead pull, cut and hold device in preparation for the winding of a second coil.

FIG. 11 shows the parts upon retraction of the supplementary wire positioning blade 232. At this time the wire insertion cylinder 226 is again energized whereupon, as shown in FIG. 12, the wire insertion finger 210 forces the finish wire $F_1$ along the guide finger 98 and then into the bottom of the selected slot in the terminal board 20. In FIG. 12 the wire insertion finger 206 is shown again engaged with the start wire $S_1$. Such engagement occurs because the position of the start wire $S_1$ has not changed from that position it occupies when it is cut free from the device 162. Engagement by the insertion finger 206 at this time has no operative effect upon the start wire $S_1$.

After the finish wire $F_1$ is inserted into the bottom of the desired slot, the hook 84 of the device 162 is retracted causing the finish wire $F_1$ to be cut while the portion of the wire $W_1$ extending to the needle 66 is clamped by the device 162. The wire insertion assembly 194 is then retracted to the idle position thereof shown in FIG. 2. The parts are accordingly in the position shown by full lines in FIG. 13. The device 162 is then wiped back across in a plane between the shuttle 70 and the winding forms so as to be in its original position indicated by phantom lines in FIG. 13 and by full lines in FIG. 14 in preparation for the continued reciprocation and oscillation of the shuttle 70 to complete the winding of the two coils $C_1$ and $C_2$.

Figure 14:
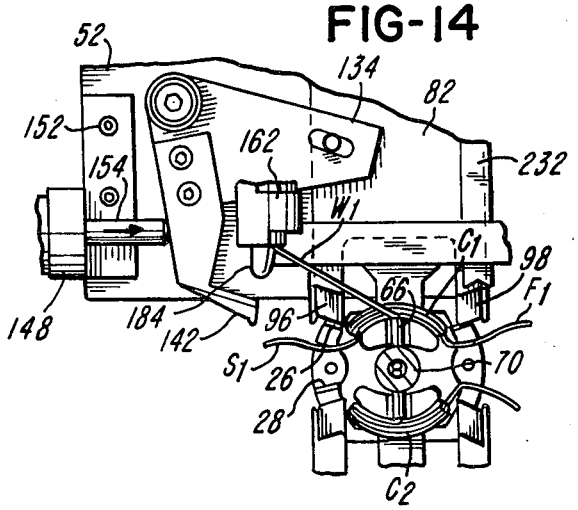
FIG. 14 is an elevational view similar to FIG. 13 with additional parts to illustrate the manner in which another slot in the terminal board is selected and with the parts located in preparation for the winding of the second coil.

When the shuttle 70 first begins to oscillate in a counterclockwise direction from that illustrated in FIG. 14, the length of the wire $W_1$ between the device 162 and the needle 66 will again be aligned with the wire guide finger 96 and, as the shuttle 70 begins to reciprocate through the stator, that wire portion will be cammed down the guide finger 96 into alignment with the desired slot in the terminal board 18. In some cases that slot would be the same slot in which the start wire $S_1$ is located. Such may be the case since the start wires of both the tap and the full coil wound on the pole piece 14 could be electrically common. For purpose of illustration, the wire guide member 82 is shown in FIG. 14 as elevated by energization of the slot selection cylinder 144 so as to locate the wire guide finger 96 adjacent the transverse slot 26. Accordingly, when the aforementioned section of wire $W_1$ is cammed down the wire guide finger 96 it will be aligned with slot 26.

After completion of the winding of both coils $C_1$ and $C_2$, the operations described with respect to FIGS. 9–13 will be repeated, this time with respect to both wires $W_1$ and $W_2$ so that a finish wire will be extended from the completed coil $C_1$ and connected to one of the transverse slots in the board 20 and another finish wire will be extended from the coil $C_2$ into the desired transverse slot in the terminal board 18. The specific slots which are selected will depend upon the desired location of the start and finish wires. Although the start wire $S_1$ is shown in the slot 27 closest to the horizontal centerline of the terminal board 18, it may be desired to insert the start wire in the uppermost transverse slot 26, such being accomplished as described above by appropriate positioning of the wire guide member 82.

Upon completion of the winding of coils $C_1$ and $C_2$ and connection of the finish wires extended therefrom, the retainer plates are moved out of engagement with the locking pins connected to the winding forms and retracted such as is indicated at 74a in FIG. 3. The winding forms are then removed and the next stator to be wound located at the winding station 50. As described above, the finger 142 is moved to the position shown by phantom lines 142a in FIG. 3 when the retainer plate 74 is retracted to its position indicated by phantom lines 74a. As the unwound stator is moved into the winding station 50 is pushes the wound stator out of the winding station 50. When the retainer plate 74 is subsequently extended to lock the winding forms in winding position relative to the unwound stator, the finger 142 pivots about the axis of the pivot stud 136 whereupon it engages and forcibly moves the wound stator an additional distance away from the winding station 50 as shown in FIG. 3 so that the start and finish wires of the wound stator will not interfere with the winding of the unwound stator. As a result of the wiping or pivoting movement of the lead pull, cut and hold devices 162 and 190 back to their start positions, the parts are in readiness for the winding of the unwound stator as soon as the winding forms are locked into position. The operation described above in connection with FIGS. 5–14 are repeated for the winding of the unwound armature.

In some cases it is desirable to form a loop in the first side of the first coil turn so that this side is held outwardly from the coil which is subsequently wound. The purpose in holding the first side of the first turn away from the subsequently wound turns is to prevent damage to the insulating coating on this wire which extends at an angle relative to all the other turns. When such a loop is drawn, the operation described above is desirably modified. For a better understanding of this circumstance, FIGS. 15 to 17 show an improved lead loop hooking assembly generally designated 250. This hooking assembly is on the end of the stator opposite the lead wire connecting assemblies described above. FIG. 15 shows an upper stator locater plate 252, a lower stator locater plate 254 and guide rails 256, all of which would be positioned on the opposite side of the stator from the stator locater plate 52 described above. Retainer plates 258 and 260 are shown in gibs formed in part by guide plates 262 on the stator locater plates 52 and 254. An upper lead loop hook 264 having a notched lower end 266 adapted to engage the first turn of the first coil wound on the upper pole piece is suspended from and adapted to be vertically driven by a first air operated cylinder 268. A lower lead loop hook 270 having a notched upper end 272 is mounted upon and vertically movable by a second air cylinder 274, the notched end 272 being located for engagement with the first turn of the wire wound onto the lower pole piece of the stator 10c. Connected to the lower stator locater plate 254 is a mounting plate 276 on which is screwed a spacer block 278 and a bracket 280 to which a pivot pin 282 is affixed for the pivotal mounting of an elongate generally vertical link 284. The upper end of the link 284 is pivotally connected at 286 to a short link arm 288 pivoted at 290 to the upper loop hook member 264. The lower end of the elongate link 284 is pivotally connected by a pivot member 292 to a short link arm 294, the opposite end of which is pivotally connected at 296 to the lower loop hook member 270. Pivot member 292 is also pivotally connected to a cylinder clevis 298 of a third air-operated cylinder 300.

At the commencement of the winding of the stator 10c, the hook members 264 and 270 are spaced from the stator 10c in the full line positions thereof illustrated in FIG. 15. Before movement of the shuttle designated 70a in FIG. 15, the hook members are moved by actuation of the first and second cylinders 268 and 274 to the phantom line positions thereof indicated at 264a and 270a in FIG. 15, which are the full line positions thereof shown in FIG. 16. After the shuttle 70a moves through the bore of the stator 10c and begins to oscillate in the direction of the arrow 302 in FIG. 16, the wires $W_1$ and $W_2$ engage and become hooked by the notched ends 266 and 272. To then move the hooked wire parts away from interference with the subsequently wound wire turns, the third cylinder 300 is actuated to pivot the elongate link 284 in a clockwise direction about the pivot pin 282 which causes the upper lead loop hook 264 to be moved to the right and the lower lead loop hook 270 to be moved to the left into the position indicated by the phantom lines 264a and 270a in FIG. 16. The hooked parts of the wire thus are brought to the position shown in FIG. 17. The hooks remain in the position thereof shown in FIG. 17 until the winding of the coils by the wires $W_1$ and $W_2$ is completed at which time they are retracted by operation of the first and second cylinders 268 and 274 which may occur simultaneously with or prior to movement of the pivot 292 back to its start position shown in FIG. 15 so as to move the notched ends 266 and 272 out of engagement with the wires.

When the lead loop assembly shown in FIGS. 15–17 is used, the wire inserting assembly 194 is not advanced toward the stator until after release of the wires from the notched ends 266 and 272. The assembly 194 can then be immediately advanced to insert the start lead wires into the bottoms of the transverse slots in the terminal boards. Upon insertion of the wires into the bottoms of the slots, the previously hooked wire parts may be drawn taut to thereby extend to an essentially straight line from the terminal boards to their associated coils because of the pulling and bending of the wire around the outside surface of the terminal boards as shown in FIG. 8.

Although the presently preferred embodiments of this invention have been disclosed, it will be understood that within the purview of this invention various changes may be made within the scope of the appended claims.

Having thus described my invention, I claim:

1. In a method of winding a coil onto a stator core and for connecting lead wires extending from the coil into slots in one or more terminal boards mounted on the stator core, the steps comprising:
   a. at the end of the winding of a coil by a shuttle, stopping the shuttle movement adjacent one end of the stator core,
   b. engaging the section of wire between the coil and the shuttle and moving said section to one side of the stator core,
   c. guiding said section into alignment with one of said slots,
   d. inserting said section into said one of said slots,
   e. clamping the wire portion between said one of said slots and the shuttle, and
   f. cutting the wire portion between the clamped portion thereof and said one of said slots.

2. In a method of winding a coil onto a stator core and for connecting lead wires extending from the coil to terminal connection means mounted on the stator core, the steps comprising:
   a. at the end of the winding of the coil by a shuttle, stopping the shuttle movement adjacent one end of the stator core,
   b. engaging the section of wire between the coil and the shuttle and moving said section to one side of the stator core,
   c. guiding said section into alignment with a wire holding portion of said terminal connection means,
   d. moving said section of wire into engagement with said wire holding portion,
   e. clamping the wire portion between said wire holding portion and the shuttle, and
   f. cutting the wire portion between the clamped portion thereof and said wire holding portion.

3. In a method of winding a coil onto a stator core and for connecting lead wires extending from the coil to one or more terminal boards having terminal slots and mounted on the stator core, the steps comprising:
   a. winding a coil on the stator core by a winding device,
   b. engaging the section of wire between the wound coil and the winding device and moving said section to a position wherein it is at least in approximate alignment with a terminal slot in a terminal board on the stator core,
   c. guiding said section into alignment with said slot and inserting said section into said slot,
   d. clamping the wire portion between said slot and said winding device, and
   e. cutting the wire portion between the clamped portion thereof and said slot.

4. The method of claim 3 further comprising repositioning the clamped wire portion while maintaining the clamping thereof so that the wire portion between the clamped portion thereof and said winding device is in approximate alignment with another terminal slot in preparation for the commencement of the winding of another coil.

5. Apparatus for winding stators and connecting the lead wires extending from the coils wound on the stators to slots in terminal boards mounted on the stators comprising a reciprocatory and oscillatory driven shuttle used for winding coils, wire guide means for guiding the coil lead wires into substantial alignment with said slots, wire clamp means for clamping the wire portions between a stator and said shuttle, and wire insertion means for inserting the lead wires aligned with the slots into the slots, said wire clamp means comprising a wire clamp device and means mounting said wire clamp device for movement from one side of each stator to the other side of each stator so that the wire extending from the shuttle may be clamped at the finish of the winding of one stator and repositioned by movement of said clamp device for commencing the winding of another stator.

6. The apparatus of claim 5 wherein said clamp device includes an extensible hook arm for engaging the section of wire between a wound coil and said shuttle to position said section adjacent said wire guide means at the end of the winding of a coil.

7. The apparatus of claim 5 wherein said means mounting said wire clamp device mounts said wire clamp device for pivotal movement so that said clamp device may be repositioned by pivotal movement.

8. Apparatus for winding stators and connecting the lead wires extending from the coils wound on the stators to wire holding portions of terminal connection means mounted on the stators comprising a reciprocatory and oscillatory driven shuttle used for winding coils, wire guide means for guiding the coil lead wires into substantial alignment with said wire holding portions, wire clamp means for clamping the wire portions between a stator and said shuttle, and means for moving the lead wires into engagement with said wire holding portions, said wire clamp means comprising a wire clamp device and means mounting said wire clamp device for movement from one side of each stator to the other side of each stator so that the wire extending from the shuttle may be clamped at the finish of the winding of one stator and repositioned by movement of said clamp device for commencing the winding of another stator.

9. The apparatus of claim 8 wherein said means mounting said wire clamp device mounts said wire clamp device for pivotal movement so that said clamp device may be repositioned by pivotal movement.

10. Apparatus for successively winding stators and connecting the lead wires extending from the coils wound on the stators to terminal connection means having wire holding portions mounted on each stator comprising:
a. a coil winding device for winding coils onto the stators,
b. wire clamp means for gripping wire extending from said winding device in preparation for the winding of a coil,
c. means for positioning said wire clamp means effective to place the wire section extending between said clamp means and said winding device in a position relative to a first wire holding portion of said terminal connection means such that said wire section is moved toward said wire holding portion upon commencement of the winding of a coil by said winding device,
d. means for actuating said clamp means at the end of the winding of a coil effective to cause said clamp means to engage the coil finish wire section extending from the wound coil to said winding device and to position said finish wire section adjacent a second wire holding portion of said terminal connection means,
e. means for moving said finish wire section into engagement with said second wire holding portion, and
f. means for cutting said finish wire section between said clamp means and said second wire holding portion.

11. The apparatus of claim 10 further comprising:
a. wire guide means positioned to guide said finish wire section to said second wire holding portion,
b. said clamp means includes a wire engaging part for engaging said finish wire section and for positioning said finish wire section adjacent said wire guide means so that said means for moving said finish wire section into engagement with said second wire holding portion will be effective to cause said finish wire section to be moved along said wire guide means, and
c. clamp actuation means for moving said wire engaging part from an extended position wherein it can engage said finish wire section to a retracted position wherein the wire section engaged thereby is gripped.

12. An improved lead loop hooking assembly for use in a stator winding machine comprising first and second hook means, a first cylinder attached to said first hook means, a second cylinder attached to said second hook means, said cylinders being adapted for moving said hook means into and out of the paths of the wires wound by a shuttle onto a stator core, and means for moving said hook means when in said wire paths out of said wire paths while retaining sections of wires hooked thereto comprising linkage means connected to said first hook means and to said second hook means and third cylinder means for moving said linkage means for effecting the desired movement of said first and second hook means.

* * * * *

UNITED STATES PATENT OFFICE
CERTIFICATE OF CORRECTION

PATENT NO. : 4,074,418
DATED : February 21, 1978
INVENTOR(S) : Harold I. Pearsall It is certified that error appears in the above-identified patent and that said Letters Patent are hereby corrected as shown below:

Col. 1, line 52, "the" first occurrence should read -- The --.
Col. 8, line 64, "extending" should be ---extended---.
Col. 11, line 40, "hook 84" should be ---hook 184---.
Col. 12, line 29, "is" should be ---it---.
Col. 12, line 43, "operation" should be ---operations---.

Signed and Sealed this

Eighteenth Day of July 1978

[SEAL]

Attest:

RUTH C. MASON
Attesting Officer

DONALD W. BANNER
Commissioner of Patents and Trademarks